US012600432B2

(12) United States Patent
Lee

(10) Patent No.: US 12,600,432 B2
(45) Date of Patent: Apr. 14, 2026

(54) HUB-TYPE ELECTRONIC DRIVING DEVICE

(71) Applicant: AMOTECH CO., LTD., Incheon (KR)

(72) Inventor: Jeong Hoon Lee, Incheon (KR)

(73) Assignee: AMOTECH CO., LTD., Incheon (KR)

( * ) Notice: Subject to any disclaimer, the term of this patent is extended or adjusted under 35 U.S.C. 154(b) by 1007 days.

(21) Appl. No.: 17/775,881

(22) PCT Filed: Oct. 28, 2020

(86) PCT No.: PCT/KR2020/014781
§ 371 (c)(1),
(2) Date: May 10, 2022

(87) PCT Pub. No.: WO2021/096109
PCT Pub. Date: May 20, 2021

(65) Prior Publication Data
US 2022/0388598 A1 Dec. 8, 2022

(30) Foreign Application Priority Data

Nov. 13, 2019 (KR) ........................ 10-2019-0145103

(51) Int. Cl.
*B62M 6/65* (2010.01)
*B62M 6/50* (2010.01)
*B62M 6/80* (2010.01)
(52) U.S. Cl.
CPC ................ *B62M 6/65* (2013.01); *B62M 6/50* (2013.01); *B62M 6/80* (2013.01)
(58) Field of Classification Search
CPC .......... B62M 6/65; B62M 6/50; B62L 1/005; H02K 7/003; H02K 1/187; H02K 1/2786; H02K 11/215; G02B 6/44

(Continued)

(56) References Cited

U.S. PATENT DOCUMENTS 6,278,216 B1 8/2001 Li
2003/0094867 A1* 5/2003 Wolters ................ H02K 21/227
310/156.01

(Continued)

FOREIGN PATENT DOCUMENTS

CN 102317143 A * 1/2012 ............. B62K 25/02
CN 206107229 U * 4/2017

(Continued)

OTHER PUBLICATIONS

English Translation of KR20120096634A (Year: 2012).*

(Continued)

*Primary Examiner* — Terrance L Kenerly
*Assistant Examiner* — Theodore L Perkins
(74) *Attorney, Agent, or Firm* — CANTOR COLBURN LLP

(57) ABSTRACT

A hub-type electronic driving device comprises: a housing comprising a wheel and a cover, the wheel having a rim formed on the outer periphery thereof such that a tire is coupled thereto, the wheel having the shape of a cup, one side of which is open, and the cover having an outer peripheral portion coupled to the opening of the wheel; a motor shaft having both ends fixedly installed on a body in which the hub-type electronic driving device is installed; first and second bearings installed in through-holes formed at centers of the wheel and the cover, respectively, so as to rotatably support the housing around the motor shaft; a BLDC motor contained in the housing so as to rotate the housing around the motor shaft; a cable containing multiple wires for applying a motor driving signal from a motor driving circuit installed outside the housing to the BLDC motor; and a cable guide assembly installed between the motor shaft and the first bearing supporting the wheel so as (Continued)

to maintain a sealing state when the cable is introduced into the housing or withdrawn therefrom.

12 Claims, 11 Drawing Sheets

(58) Field of Classification Search
USPC .......................................................... 310/424
See application file for complete search history.

(56) References Cited

U.S. PATENT DOCUMENTS

2010/0207474 A1 * 8/2010 Osada ................. B60L 15/2009
                                                    310/114
2018/0111487 A1 * 4/2018 Xu ......................... H02K 7/108

FOREIGN PATENT DOCUMENTS

| CN | 206863291 | U | * | 1/2018 | | |
| KR | 200249721 | | | 11/2001 | | |
| KR | 20060063024 | | | 6/2006 | | |
| KR | 20110122648 | | | 11/2011 | | |
| KR | 20110139552 | | | 12/2011 | | |
| KR | 20120096634 | | | 8/2012 | | |
| KR | 20120096634 | A | * | 8/2012 | ............. | H02K 16/02 |
| KR | 20190048470 | A | * | 5/2019 | ............. | H02K 5/225 |
| WO | WO-2009048181 | A1 | * | 4/2009 | ............. | H02K 3/522 |

OTHER PUBLICATIONS

English Translation of CN102317143A (Year: 2012).*
English Translation of WO2009048181A1 (Year: 2009).*
CN-206107229-U English Translation (Year: 2017).*
CN-206863291-U English Translation (Year: 2018).*
KR-20190048470-A English Translation (Year: 2019).*
International Search Report—PCT/KR2020/014781 dated Jan. 13, 2021.

* cited by examiner

HUB-TYPE ELECTRONIC DRIVING DEVICE

TECHNICAL FIELD

The present invention relates to a hub-type electronic driving device and, more specifically, to a hub-type electronic driving device having a motor contained in a housing which also functions as a motor casing.

BACKGROUND ART

An electric bicycle is equipped with a direct-current (DC) motor on a wheel hub or a crank shaft of a general bicycle and assists power, thereby enabling pleasant driving in a plain road and an uphill road.

The standard for the application range of the electric bicycle refers to a two-wheeled bicycle with electric motor power to supplement the human power. The electric bicycle has necessarily a pedal driving function, while moving with electric motor power, and is classified as follows according to the driving system.

First, a throttle mode: A bicycle that is moved only on the power of an electric motor by operating an electric bicycle accelerator lever.

Second, a pedal assist system (PAS) mode: A bicycle that is moved by simultaneous power of an electric bicycle pedal and an electric motor.

Third, a throttle/PAS combination mode: A bicycle that support both a throttle mode and a PAS mode.

The throttle mode electric bicycle can control the speed of the bicycle from a low speed to a high speed by controlling the rotational force of the motor by manipulating an accelerator. The driving mode by the accelerator is referred to as a scooter mode.

A pedal assistance system (PAS) mode electric bicycle, employs a PAS mode for automatically rotating a motor by sensing a pedal when the pedal is driven. A torque sensor measures a pedal effort applied to a pedal by a bicycle driver and provides the calculated torque information to an electric bicycle controller. As the pedal effort applied to the pedal increases, the output of the motor also increases. The driver can actively control the DC motor output of the electric bicycle by adjusting the pedal effort applied to the pedal by the driver.

A hub-type driving motor having a motor contained in a hub for driving an electric vehicle and an electric motorcycle including the electric bicycle is presented in Korean Patent Publication No. 10-2012-0096634 (Patent document 1).

Patent document 1 discloses a technology in which a double-rotor and single-stator type BLDC motor is contained in a motor casing composed of a casing body and a casing cover, the BLDC motor in which a single-stator is coupled to a motor shaft and a double-rotor is installed in the motor casing, which rotates the motor casing around the motor shaft, and an S-pole inner magnet of an internal rotor and an N-pole outer magnet of an external rotor are deflected at a preset angle, to improve the initial maneuverability of the motor.

Patent document 1 is a double-rotor and single-stator type BLDC motor in which both ends of the motor shaft are fixedly coupled to the frame of a body and the motor casing rotates around the fixed motor shaft.

In addition, the BLDC motor of Patent document 1 has a motor shaft having a hollow or solid shaft shape, and includes: a shaft front portion for supporting a bearing for a casing cover; a circular plate-shaped stator shaft connection portion protruding from the circumferential surface of the rear side of the shaft front portion; and a shaft rear portion having a circular block shape of a relatively large diameter relative to the shaft front portion so as to support a bearing for a casing body at the rear side of the stator shaft connection portion, wherein an inlet hole for passing a power line is formed at the shaft rear portion.

In general, an electric vehicle, an electric motorcycle, an electric bicycle, or the like has an electric motor built in a hub for the rotation of a wheel, and a power supply battery which is installed outside the hub.

In the BLDC motor of Patent document 1, a power line for supplying power from the outside of the motor casing is connected to a control unit through the inside of the motor shaft having a hollow or solid shaft shape. Patent document 1 discloses a structure in which a power line passes through an inlet hole in the shaft rear portion of the motor shaft, but a sealing method of the inlet hole through which the power line passes has not been proposed.

In general, since the motor shaft is made of a high-strength metal material, precision processing is not easy, and since it is difficult to install a sealing O-ring or the like inside the inlet hole of the motor shaft, it is difficult to completely seal the power line passing region of the inlet hole when the power line passes through the inlet hole. In the case of employing a separate sealing structure, cable extension through the inlet hole has a problem of degrading the productivity of the assembly operation.

A hub-type electronic driving device, such as an electric vehicle, an electric motorcycle, an electric bicycle, and the like, has a structure in which an electric motor is contained in a housing, which also functions as a motor casing, and the housing is rotated in contact with the ground through a tire. Therefore, a mutual coupling structure between the rotor, the stator, and the motor shaft contained in the housing as well as the housing is required to have structural rigidity capable of enduring impact, vibration, dynamic and static loads.

Patent document 1 has a structure in which an inner rotor and an outer rotor are integrally formed in a casing body, a stator is arranged between the inner rotor and the outer rotor, and is coupled between a stator frame extending axially from the stator and a stator connection portion extended to the outer circumference of the motor shaft, and thus due to weak coupling force between the stator and the motor shaft, durability may be reduced.

In addition, in Patent document 1, an asymmetric double-rotor and single-stator type BLDC motor is contained in the motor casing, and thus the center of gravity of the motor is biased, which may cause partial wear or noise generation.

Moreover, it is difficult to implement an environment capable of cooling electronic components inside the housing that also serves as a motor casing, and thus it is preferable that a control unit (i.e., the driver, etc.) for controlling the electric motor is minimally left, and the rest of the control unit is disposed outside the housing.

DISCLOSURE

Technical Problem

The present invention has been devised in consideration of the conventional problems, and an object of the present invention is to provide a hub-type electronic driving device capable of easily withdrawing and sealing a cable by withdrawing the cable through a cable through-hole penetrating the inside and the outside of a wheel using a cable guide bracket coupled to the outside of a motor shaft.

Another object of the present invention is to provide a hub-type electronic driving device which can be stably coupled by employing a key coupling structure between a stator and a motor shaft.

Another object of the present invention is to provide a hub-type electronic driving device having improved assemblability and durability by using an integrated core frame in which a plurality of teeth are radially extended on the outer circumference of an annular yoke of a stator and an inner ring coupled to a motor shaft is connected to the inside of the annular yoke through a plurality of bridges.

Another object of the present invention is to provide a hub-type electronic driving device which has a balanced support structure without deflection of a rotor fixed to a wheel and a stator fixed to a motor shaft in an axial direction and a circumferential direction, which may prevent partial wear or suppress noise generation.

Technical Solution

According to an embodiment of the present invention, there is provided a hub-type electronic driving device including: a housing having a cup-shaped wheel and a cover having an outer circumferential portion which is coupled to an opening of the wheel; a motor shaft having both ends which are fixedly installed on a body outside the housing; first and second bearings installed in respective through-holes formed at the centers of the wheel and the cover to rotatably support the housing around the motor shaft; a BLDC motor which is contained in the housing so as to rotate the housing around the motor shaft; a cable containing a plurality of wires for applying a motor driving signal to the BLDC motor from a motor driving circuit installed outside the housing; and a cable guide assembly installed between a first bearing supporting the wheel and the motor shaft to provide a shaft through-hole and a cable through-hole through which the motor shaft and a cable pass, respectively, and to maintain the sealing state of the shaft through-hole and the cable through-hole.

The cable guide assembly includes: a cable guide bracket which is installed between the first bearing and the motor shaft, and has a shaft through-hole formed in the center thereof and through which the motor shaft is penetrated and coupled, and a cable through-hole deflected to one side from the shaft through-hole and through which the cable passes; a silicon rubber ring inserted into the cable through-hole and fitted to the outer circumference of the cable; and a cable bracket cover fitted into the cable through-hole so that the front end portion thereof fixes the silicon rubber ring.

In addition, the cable guide bracket includes: a body in which the shaft through-hole and the cable through-hole are formed; a cylindrical tube extending from the body to the outside of the wheel so that the shaft through-hole is longer than the cable through-hole; and an annular flange extending inside the wheel and serving as a stopper caught by the inner circumference of the first bearing, wherein the cable through-hole may have a stepped portion that limits the position of the silicon rubber ring when the cable bracket cover is inserted into the cable through-hole.

Furthermore, the cable guide assembly further includes: a first O-ring configured to seal between the first bearing and the cable guide bracket; and a second O-ring configured to seal state between the shaft through-hole of the cable guide bracket and the motor shaft.

The BLDC motor includes: a rotor in which a back yoke and a magnet are stacked on a cylindrical inner wall of the cup-shaped wheel; and a stator having an outer circumferential portion facing the magnet of the rotor with an air gap and having a central portion coupled to the outer circumference of the motor shaft to be fixed, and applying a rotating magnetic field to the rotor.

In addition, the BLDC motor further includes: an annular sensing magnet installed on the bottom of the cup-shaped wheel and configured to have a magnetic pole corresponding to the rotor magnet; and a Hall sensor assembly installed in the stator facing the sensing magnet to sense a rotation position of the rotor when the rotor is rotated.

The stator includes: an integrated stator core with a plurality of teeth extending radially from a ring-shaped yoke; insulating bobbins formed by assembly or insert molding on the teeth; coils wound on the bobbins; a stator support surrounding the stator core with the bobbins integrally formed on the surface of the teeth; and a stator frame in which an outer ring is assembled by fitting coupling to the stator core and an inner ring is coupled to the motor shaft in a key coupling method using a key.

In this case, the stator is configured so that three wires carrying three-phase (U, V, W) drive signals required to drive the motor from the outside of the housing are incorporated into one cable and introduced into the housing, fixed to three busbars installed on the stator support of the stator, and then connected to three-phase (U, V, W) coils wound around a plurality of teeth, respectively.

According to another embodiment of the present invention, the stator includes: an integrated core frame in which a plurality of teeth are radially extended on the outer circumference of the annular yoke, and an inner ring coupled to the motor shaft is connected to the inside of the annular yoke through a plurality of bridges; an insulating film surrounding four side surfaces of the plurality of teeth except the outer circumferential surface facing the magnet of the rotor; first and second insulators, each having an annular body and a plurality of extensions radially extending from the annular body to correspond to the plurality of teeth and the annular yoke, and assembled to one side and the other side of the integrated core frame; and coils wound around the teeth portion surrounded by the insulating film and the first and second insulators.

The first insulator further includes an annular extension portion extending inward of the annular body, and the annular extension portion may include a Hall sensor fixing part for installing the Hall sensor assembly and a plurality of nuts embedded to fix bolts for the bus bars.

According to another embodiment of the present invention, the stator includes: a common terminal which is insert-molded into the annular body so that three common terminal ends protrude above the annular body, and forms a neutral point when the three-phase (U, V, W) coils are connected in a Y-wiring manner; and a plurality of winding guide protrusions integrally formed in the annular body and serving as a guide of the coils when the coils are wound on the plurality of teeth.

According to an embodiment of the present invention, there is provided a hub-type electronic driving device including: a housing having a cup-shaped wheel and a cover having an outer circumferential portion which is coupled to an opening of the wheel; a motor shaft having both ends which are fixedly installed on a body outside the housing; first and second bearings installed in through-holes formed at the centers of the wheel and the cover, respectively, to rotatably support the housing around the motor shaft; a BLDC motor which is contained in the housing and rotates the housing around the motor shaft; a rotor in which a back yoke and a magnet are stacked on a cylindrical inner wall of the cup-shaped wheel; a stator having an outer circumferential portion facing the magnet of the rotor with an air gap and having a central portion coupled to the outer circumference of the motor shaft to be fixed, and applying a rotating magnetic field to the rotor; a cable containing a plurality of wires for applying a motor driving signal to the BLDC motor from a motor driving circuit installed outside the housing; and a cable guide assembly installed between a first bearing supporting the wheel and the motor shaft to provide a shaft through-hole and a cable through-hole through which the motor shaft and a cable pass, respectively, and to maintain the sealing state of the shaft through-hole and the cable through-hole, wherein the housing is rotated around the motor shaft by the BLDC motor which is contained in the housing.

The stator may include an integrated core frame in which a plurality of teeth are radially extended on the outer circumference of the annular yoke, and an inner ring coupled to the motor shaft is connected to the inside of the annular yoke through a plurality of bridges.

The hub-type electronic driving device further includes a brake device which is installed outside the cover and brakes the rotation of the housing, wherein the brake device includes: a brake ring installed in a groove of the cover; a brake pad installed inside the brake ring and contracted and extended in accordance with the operation of a brake to compress the outer circumferential portion on the inner circumferential surface of the brake ring; and a brake body coupled to an inlet of the groove to block the inlet and having a central portion fixedly coupled to the motor shaft.

Further, the motor shaft includes: first and second body coupling portions having threads formed at both ends thereof to be screw-coupled to the frame of the body; a cable guide bracket coupling portion to which a cable guide bracket of the cable guide assembly is coupled; a stator coupling portion coupled to an integrated core frame of the stator in an intermediate portion of the stator by a key coupling method; and a brake body coupling portion to which a brake body of the brake device is coupled, and wherein a plurality of stepped portions that increase or decrease in diameter are formed between the first body coupling portion, the cable guide bracket coupling portion, the stator coupling portion, the brake body coupling portion, and the second body coupling portion, and the stepped portions may define an installation position of each portion.

The hub-type electronic driving device according to the present invention may be used in any one of an electric bicycle, an electric vehicle, an electric motorcycle, an electric scooter, and an electric kickboard.

Advantageous Effects

As described above, the present invention is applied to a hub-type driving motor in which a motor is contained in a housing which also serves as a motor casing for driving an electric bicycle, an electric vehicle, an electric motorcycle, an electric scooter, and an electric kickboard.

Conventionally, in order to connect to a stator inside a motor casing (housing), a power line is supplied through the inside of the motor shaft having a hollow or solid shaft shape. When the motor contained in the motor casing (housing) is a three-phase driving BLDC motor, a three-phase driving signal supply wire to the BLDC motor and a plurality of signal line wires for controlling motor driving from a driving circuit (driver) disposed outside the motor casing (housing) should also be drawn out. Therefore, when the plurality of wires are contained in one cable, the diameter of the cable increases, and thus the method of withdrawing the cable through the inside of the motor shaft is not easy to form the workability and the sealing structure.

According to the present invention, the cable guide bracket coupled to the outside of the motor shaft is used to introduce the cable through the cable through-hole penetrating the inside and the outside of the wheel, thereby facilitating the introduction and sealing of the cable.

In addition, the present invention employs a key coupling structure between the stator and the motor shaft to achieve stable coupling.

Further, the present invention may improve assemblability and durability by using an integrated core frame in which a plurality of teeth are radially extended on the outer circumference of an annular yoke of a stator and an inner ring coupled to a motor shaft is connected to the inside of the annular yoke through a plurality of bridges.

Further, the present invention has a balanced support structure without deflection of a rotor fixed to a wheel and a stator fixed to a motor shaft in an axial direction and a circumferential direction, which may prevent partial wear or suppress noise generation.

According to the present invention, the Hall sensor and the temperature sensor for sensing the rotor rotation position necessary for driving the BLDC motor are mounted on the Hall sensor assembly installed inside the housing and the remaining motor driving circuit (control unit, etc.) required to drive the BLDC motor may be arranged in the body outside the housing, thereby facilitating the heat dissipation of the motor driving circuit (the control unit, etc.), and stably supporting the BLDC motor by avoiding the impact and vibration environment.

BEST MODE

Figure 1A:
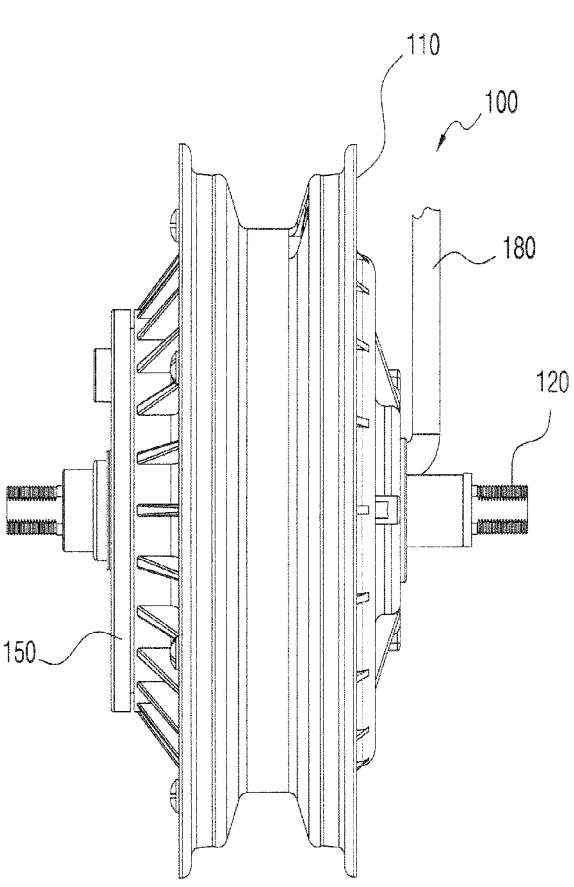
FIGS. 1A to 1C are front, right, and left side views, respectively, of a hub-type electronic driving device according to the present invention.
Figure 1B:
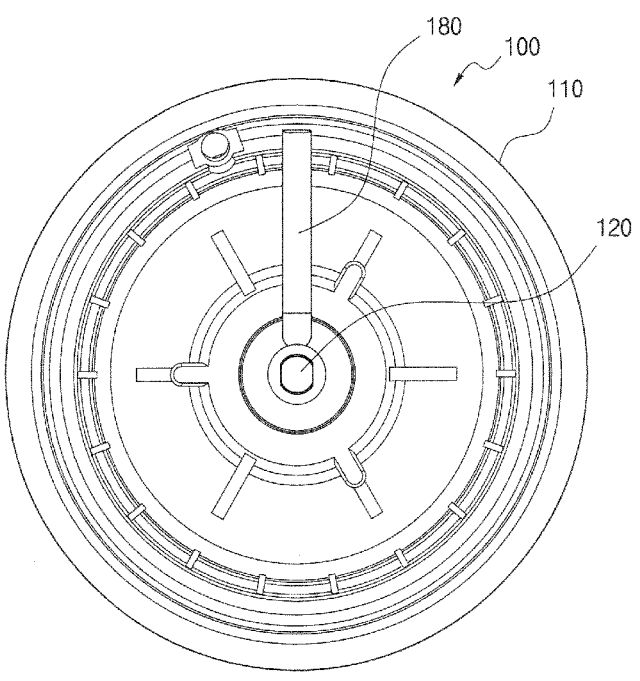
Figure 1C:
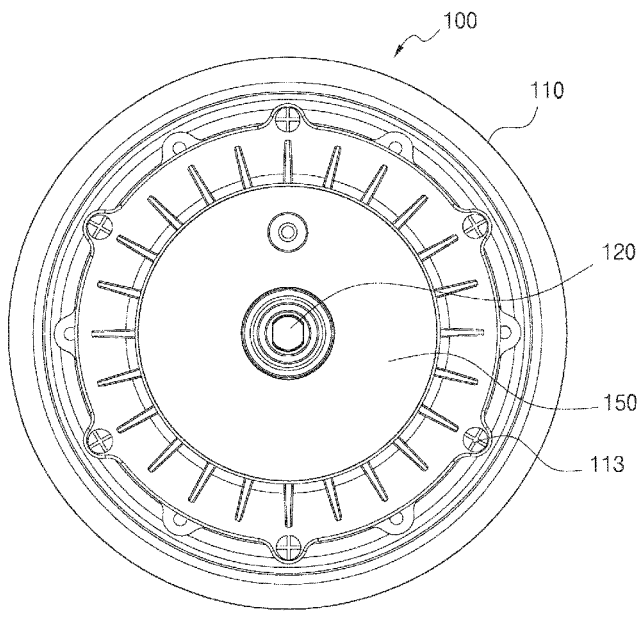

Hereinafter, embodiments of the present invention will be described in detail with reference to the accompanying drawings.

The sizes and shapes of the components shown in the drawings may be exaggerated for clarity and convenience. In addition, terms defined in consideration of the configuration and operation of the present invention may vary depending on the intention or custom of the user, the operator, and the like. Definitions of these terms should be based on the content of this specification.

A hub-type electronic driving device according to the present invention is applied to a hub-type driving motor in which a motor is contained in a wheel which also serves as a motor casing for driving an electric bicycle, an electric vehicle, an electric motorcycle, an electric scooter, and an electric kickboard. In the following description, the target to which the driving device is applied is defined as a "body".

When the hub-type electronic driving device according to the present invention is applied to one of an electric bicycle, an electric motorcycle, an electric scooter, and an electric kickboard, each having a body of two wheels, an installation position of the hub-type electronic driving device is determined depending on whether the body employs a front wheel driving system or a rear wheel driving system. When the body is an electric vehicle or electric cart having four wheels, the hub-type electronic driving device is applied to each of both the rear wheels in the case of a rear wheel drive, and the hub-type electronic driving device is applied to each of all four wheels in the case of a four-wheel drive.

Referring to FIGS. 1A to 4, the hub-type electronic driving device 100 according to the present invention largely includes a housing 110, a motor shaft 120, a rotor 130, a stator 140, a brake device 150, first and second bearings 161 and 162, a Hall sensor assembly 170, a cable 180, and a cable guide assembly 190.

In the hub-type electronic driving device 100 according to the present invention, both ends of the motor shaft 120 are fixed to the body without rotating the motor shaft 120, and the rotor 130 and the housing 110 of a BLDC motor 200 contained in the housing 110 are rotated according to the rotation magnetic field of the stator 140 fixed to the motor shaft 120.

Hereinafter, the structure of the hub-type electronic driving device 100 according to the present invention will be described in detail.

The housing 110 includes: a cup-shaped wheel 111 having one side which is opened in which a rim 111a to which a tire 101 is coupled is formed on an outer circumferential portion of the housing 100; and a cover 112 having an outer circumferential portion which is sealingly coupled to the opening of the wheel 111.

An O-ring 114 for sealing coupling is inserted between the opening of the wheel 110 and the outer circumferential portion of the cover 112, and is fastened and fixed with a plurality of fixing bolts 113 to maintain the assembled state of the wheel 110 and the cover 112.

Through-holes are formed at the centers of the wheel 110 and the cover 112, and first and second bearing housings 111b and 112a are formed at the outer circumferences of the through-holes, respectively, and first and second bearings 161 and 162 are installed in the first and second bearing housings 111b and 112a to rotatably support the housing 110 around the motor shaft 120.

An O-ring 189 for sealing is inserted between the second bearing 162 and the motor shaft 120.

The motor shaft 120 includes: first and second body coupling portions 121 and 126 having screw threads at both ends to be screw-coupled to the frame of the body; a cable guide bracket coupling portion 122 to which a cable guide bracket 191 is coupled; a stator coupling portion 123 coupled to the stator 140 at the middle part; and a brake body coupling portion 125 to which a brake body 151 is coupled. A plurality of stepped portions that increase or decrease in diameter are formed between the first body coupling portion 121, the cable guide bracket coupling portion 122, the stator coupling portion 123, the brake body coupling portion 125, and the second body coupling portion 126, and the stepped portions serve to define an installation position of each portion.

A circular groove 112a is formed outside the cover 112, and a brake device 150 for braking the rotation of the housing is installed in the groove 112a. The brake device 150 includes: a brake ring 152 installed in the groove 112a; a brake pad 153 which is contracted and extended inside the brake device 150 according to the brake operation to allow the outer circumferential portion thereof to be compressed on the inner circumferential surface of the brake ring 152; and a brake body 151 which is coupled to the inlet of the groove 112a to block the inlet. The central portion of the brake body 151 is fixedly coupled to the motor shaft 120.

The hub-type electronic driving device 100 according to the present invention includes a three-phase driving type BLDC motor 200 including the single rotor 130 and the single stator 140 inside the housing 110.

A back yoke 131 and a magnet 132 are stacked on a cylindrical wall of the cup-shaped wheel 110, to form the rotor 130. The magnet 132 may include a plurality of split magnets in which an N pole and an S pole are alternately arranged, or may employ a plurality of split-magnetized cylindrical magnets.

An annular sensing magnet 172 having have a magnetic pole corresponding to the rotor magnet 132 is installed on the bottom of the cup-shaped wheel 110. A Hall sensor assembly 170 in which a Hall sensor is mounted on a PCB is installed at a portion facing the sensing magnet 172 in a stator 140 to be described later so as to sense a rotation position of the rotor when the rotor is rotated.

The stator 140 is arranged with an air gap opposite to the magnet 132 of the rotor 130, and the central portion of the stator 140 is coupled and fixed to the outer circumference of the motor shaft 120 in a key coupling method using a key 124, and the rotor 130 is rotated by applying a rotating magnetic field to the rotor 130.

The stator 140 according to a first embodiment of the present invention has a structure in which, for example, three-phase (U, V, and W) coils 143 are wound on an insulating bobbin 142 formed by assembling or insert molding a plurality of teeth (i.e., the coil winding portion) 141b into the teeth of an integrated stator core 141 radially extended from the yoke (body) 141a of a ring form. The bobbin 142 integrally formed on the surface of the teeth 141b may be formed by an insert molding method using a thermosetting resin or a thermoplastic resin together with a stator support 145.

The stator 140 is configured so that three wires carrying three-phase (U, V, W) drive signals required to drive the motor from the outside of the housing 110 are incorporated into one cable 180 and introduced into the housing 110, fixed to three busbars installed on the stator support 145 of the stator 140, and then connected to three-phase (U, V, W) coils 143 wound around a plurality of teeth 141b, respectively.

In this case, the hub-type electronic driving device 100 according to the present invention may be configured in a split-core manner in which three-phase (U, V, W) coils 143 are wound by using a plurality of split cores instead of the integral stator core 141, and the stator supports 145 are simultaneously formed while being integrated into an annular shape using a molding resin.

Figure 2:
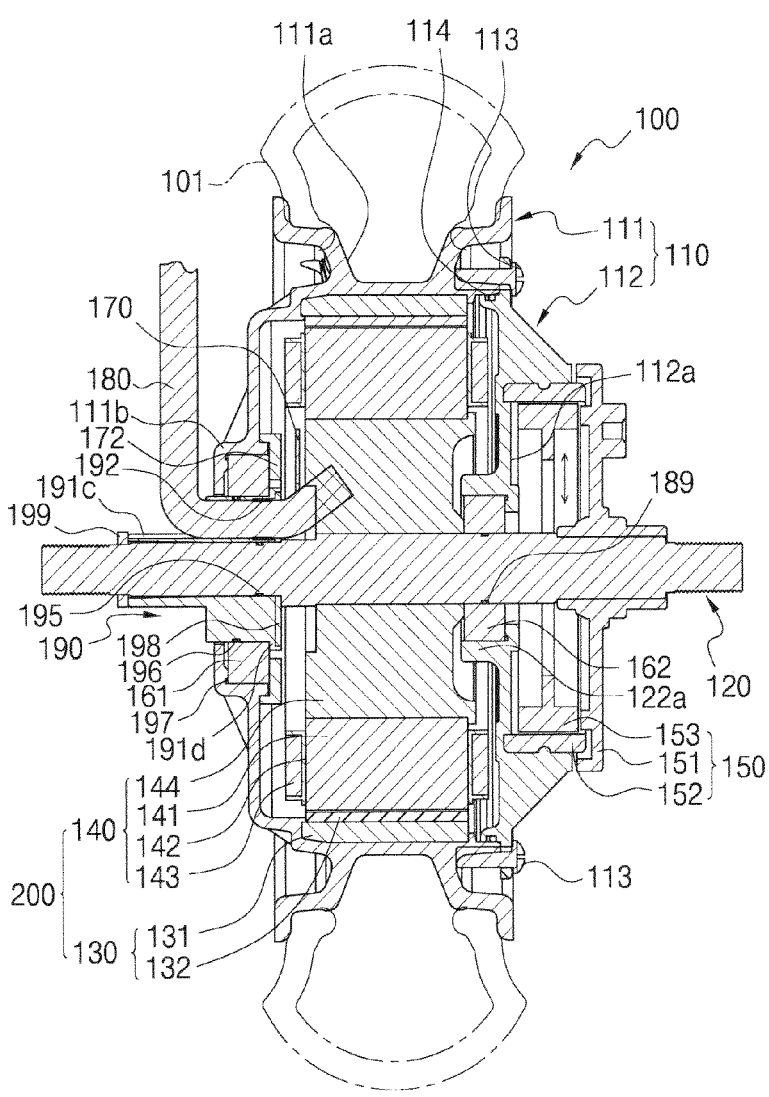
FIG. 2 is a cross-sectional view taken along the line A-A in FIG. 1C.

As illustrated in FIG. 2, the stator 140 may be integrated by forming the stator support 145 by molding the stator core 141 and the stator frame 144 with a thermosetting resin, for example, a bulk molding compound (BMC) molding material such as polyester or a thermoplastic resin, in a state where the stator core 141 and the stator frame 144 are arranged in an axial direction from the outside to the inside. In this case, the bobbin 142 defining an area where the coil 143 is wound is integrally formed on the teeth 141b of the stator core 141 except for a portion facing the magnet 132 of the rotor.

In addition, the stator 140 may be assembled by being fitted and coupled with the stator frame 144 while integrally forming the bobbin 142 and the stator support 145 in the stator core 141 and winding the three-phase (U, V, W) coils 143 on the teeth 141b. In this case, the stator frame 144 may be made of a metal material and may have a structure in which an outer ring and an inner ring (boss) 144b are connected by a plurality of connection portions 144a. That is, the stator frame 144 may have a shape in which a plurality of teeth 141b are removed from the integrated core frame 146 illustrated in FIG. 5B. The stator frame (144) may be manufactured by, for example, a die casting method using an aluminum alloy, or may be molded by a powder metallurgy method using a tungsten material.

Meanwhile, the stator 140 according to the present invention may be formed by forming an insulating bobbin and a stator support on a plurality of teeth 141b in an assembly method and winding the three-phase (U, V, W) coils 143 thereon.

A stator 140a in accordance with the second embodiment of this invention includes an integrated core frame 146, insulating films 147, first and second insulators 148 and 149, and coils 143. The insulating film 147 and the first and second insulators 148 and 149 perform the same function as the insulating bobbin and the stator support of the stator according to the first embodiment.

Figure 5A:
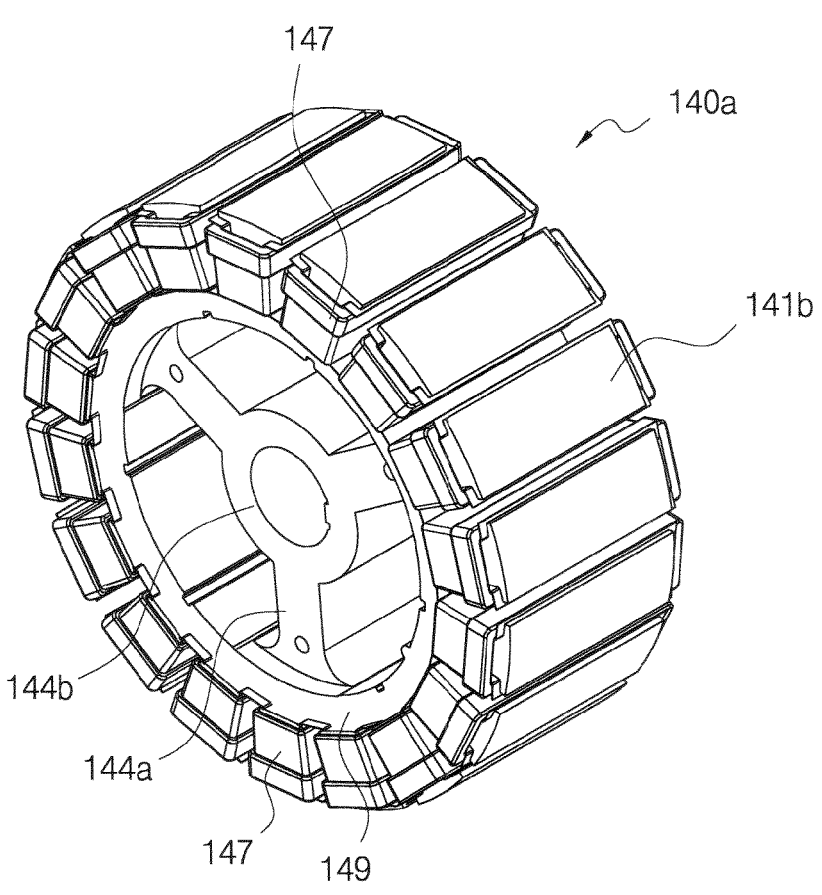
FIGS. 5A to 5C are a perspective view, an exploded perspective view, and a diameter direction cross-sectional view respectively showing a stator according to a second embodiment of the present invention.
Figure 5B:
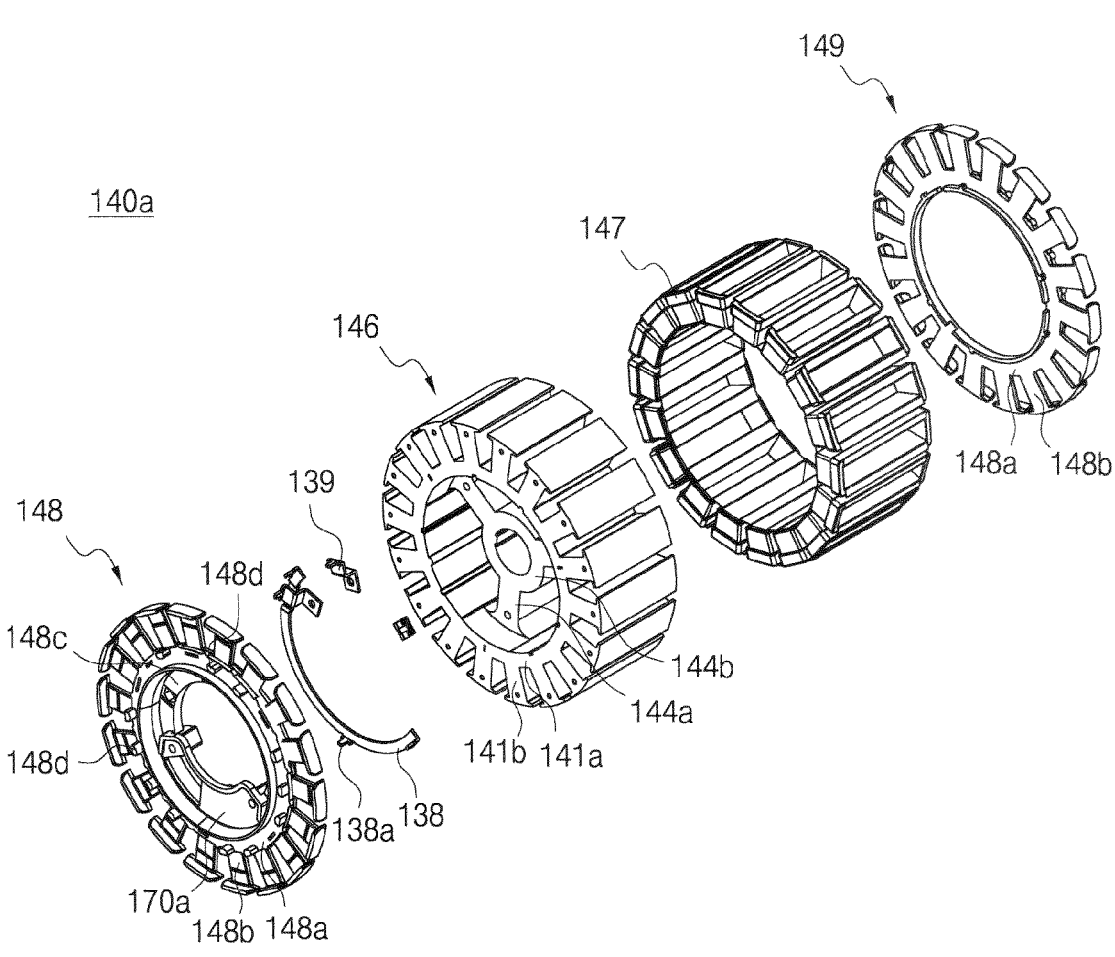
Figure 5C:
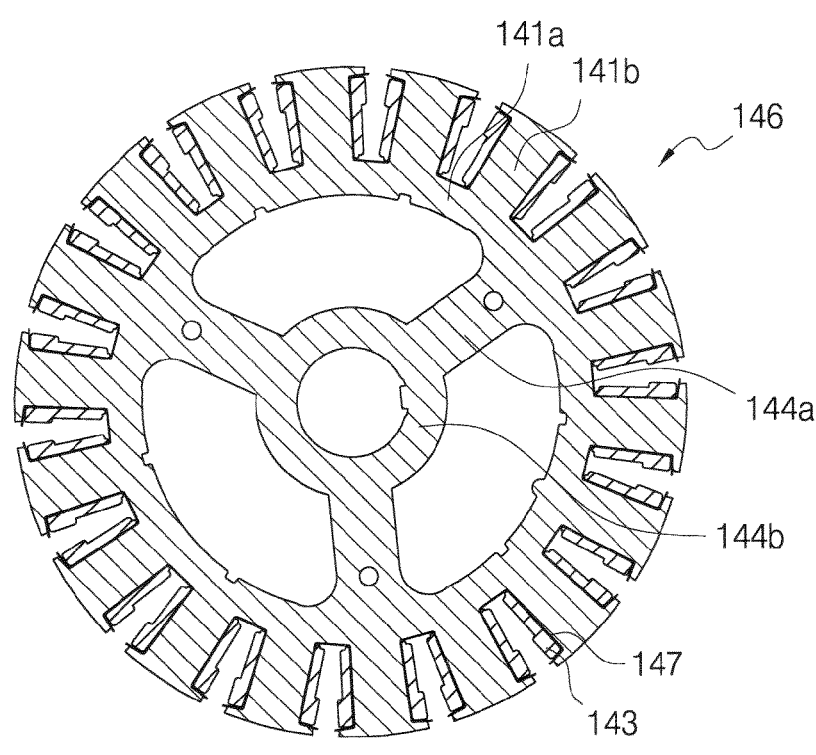
Figure 6A:
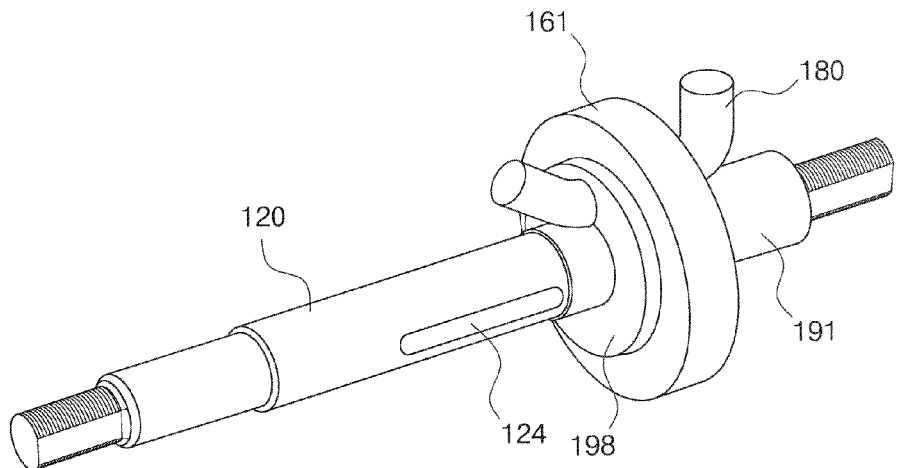
FIGS. 6A to 6D are a front perspective view, a rear perspective view, a partial cut cross-sectional view, and a partial cut cross-sectional view showing a cable removal state, respectively for illustrating a cable introduction structure in a hub-type electronic driving device according to the present invention.
Figure 6B:
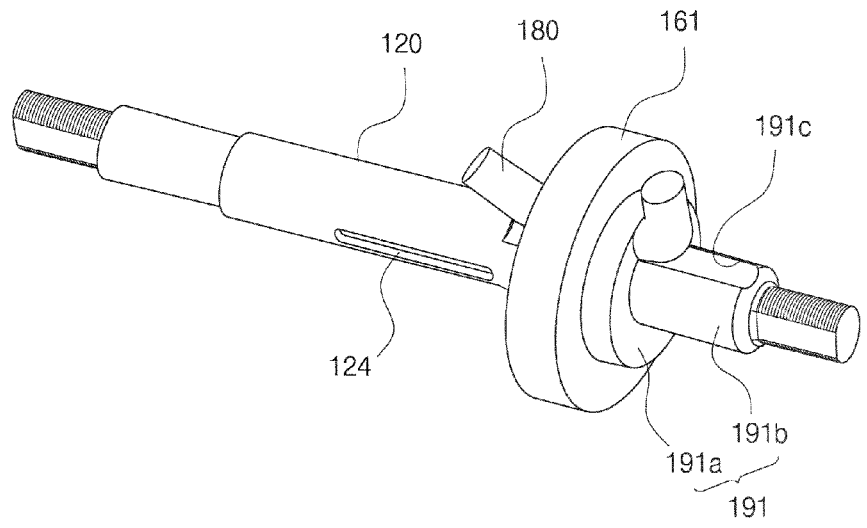
Figure 6C:
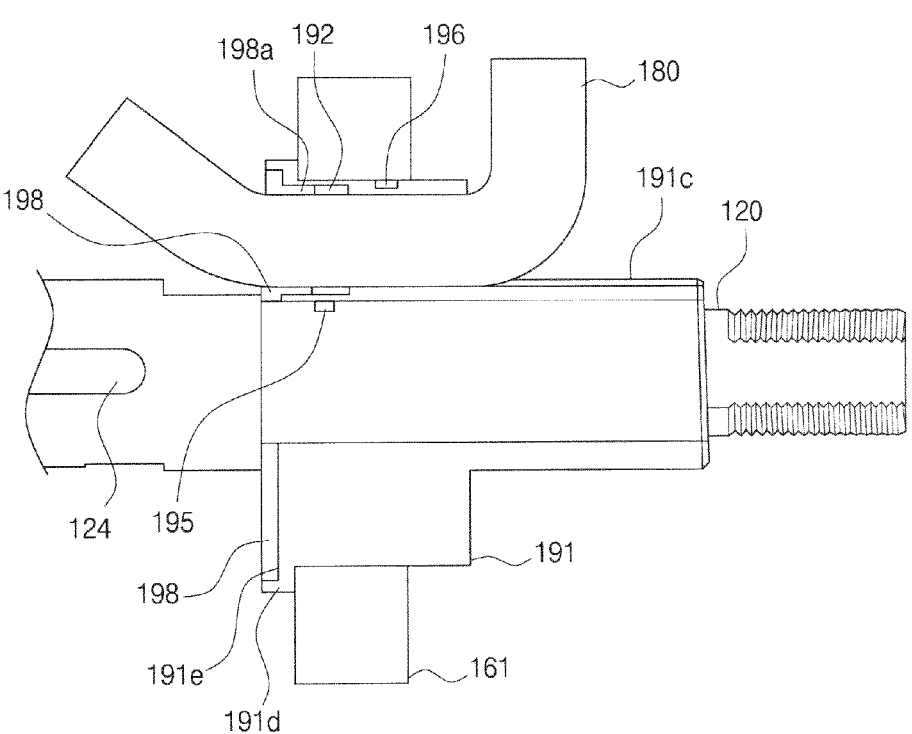
Figure 6D:
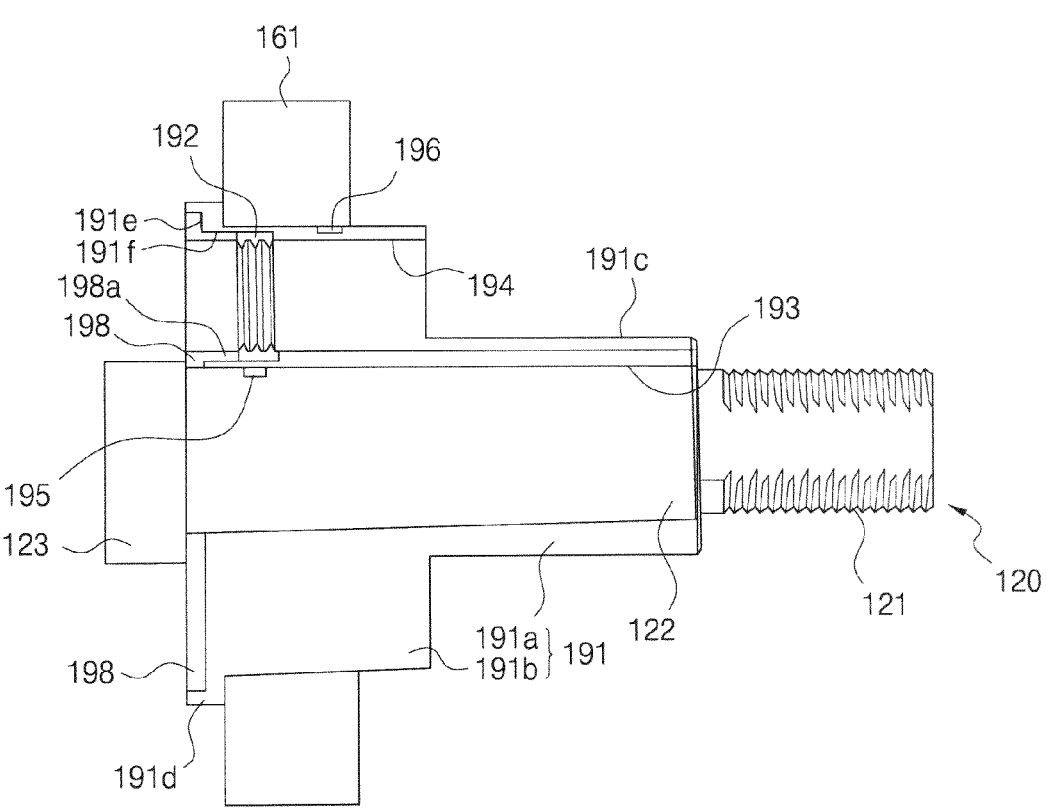

As illustrated in FIGS. 5A to 5C, the stator 140a according to the second embodiment may employ the integrated core frame 146 in which the stator core 141 and the stator frame 144 are integrated, and may be formed by stacking a plurality of thin-film silicon steel plates. The integrated core frame 146 may have a structure in which the plurality of teeth 141b radially extend around an outer circumference of the annular yoke 141a and the inner ring (boss) 144b coupled to the motor shaft 120 are connected to an inner side of the annular yoke 141a through the plurality of connection parts 144a.

The plurality of teeth 141b radially extending from the integrated core frame 146 are provided with a thin insulating film 147 formed in a substantially rectangular cylindrical shape to surround four sides except the outer circumferential surface facing the magnet of the rotor, and maintains an insulating state when the coils 143 are wound on the teeth 141b.

In addition, the stator 140a is assembled in such a manner that the first and second insulators 148 and 149 are fitted into the integrated core frame 146 such that the plurality of teeth 141b and the annular yoke 141a of the integrated core frame 146 are covered on one side and the other side. When the coils 143 are wound on the teeth 141b, the first and second insulators 148 and 149 maintain an insulating state together with the insulating film 147.

Each of the first and second insulators 148 and 149 includes an annular body 148a and a plurality of extension protrusions 148b radially extending from the annular body 148a to correspond to the plurality of teeth 141b and the annular yoke 141a, respectively.

In addition, the first insulator 148 has an annular extension part 148c extending inward of the annular body 148a. In the annular extension part 148c, a Hall sensor fixing part 170a for fixing the PCB of the Hall sensor assembly 170 using a fixing bolt or a fixing screw 171 is provided, and three nuts 139 for fixing a bolt for a busbar are embedded at intervals.

Furthermore, a common terminal 138 for forming a neutral point when the three-phase (U, V, W) coils 143 are connected in a Y-connection manner, is insert-molded in the first insulator 148, and thus three common terminal ends 138a may protrude above the first insulator 148.

The annular body 148a of the first insulator 148 may include a plurality of winding guide protrusions 148d serving as guides when moving to another tooth or changing a winding direction while maintaining tension to wind a coil around one tooth 141b and then wind the coil around another tooth, as necessary.

Figure 3:
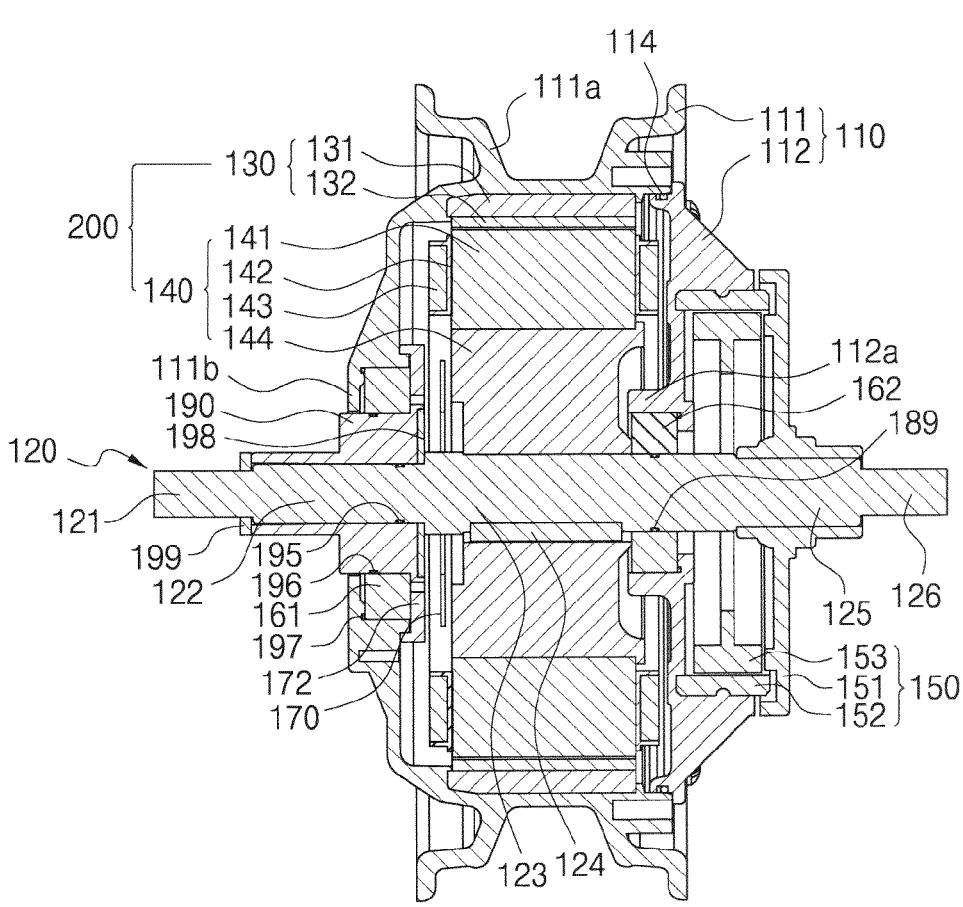
FIG. 3 is a cross-sectional view taken along the line B-B in FIG. 1C.
Figure 4:
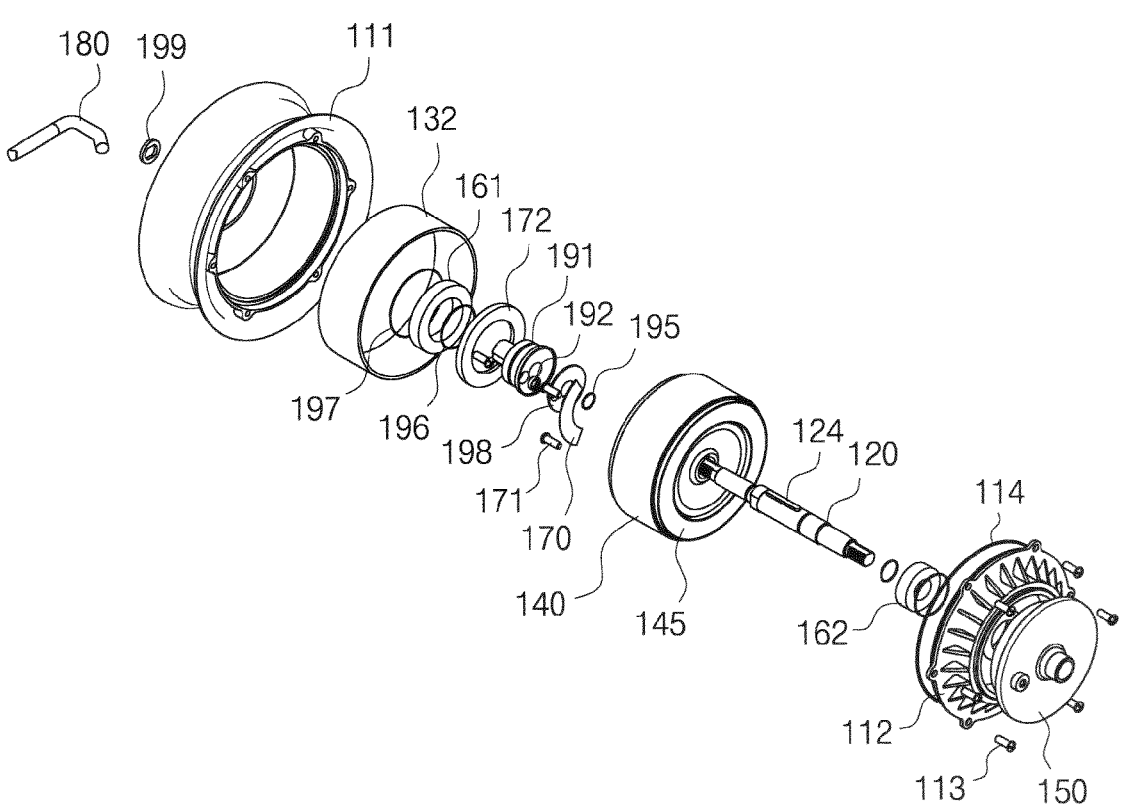
FIG. 4 is an exploded perspective view of a hub-type electronic driving device according to the present invention.

In the stator frame 144 or the integrated core frame 146 separated from the stator core 141, the inner ring (boss) 144b may be fixed to the motor shaft 120 by using a key 124 as illustrated in FIG. 3. In addition, the stator frame 144 and the integrated core frame 146 may be fixedly coupled to the motor shaft 120 in a spline coupling manner.

As a result, the coupling between the stator 140 and the motor shaft 120 is not biased in the circumferential direction or the axial direction and has a stable support structure, and thus Since the motor casing (wheel) is not biased even when rotating, no partial wear is generated, durability is improved, and noise generation may be suppressed.

The hub-type electronic driving device 100 according to an exemplary embodiment of the present invention may include a BLDC motor 200 including a 20-pole single rotor 130 and a single stator 140 having an 18-slot structure. In the stator 140, three-phase (U, V, W) coils 143 are wound around the teeth 141b of the stator core 141. From the motor drive device installed outside the housing 110 to the three-phase (U, V, W) coils 143, a driving signal is transmitted through a cable 180 in a 6-step manner.

When the BLDC motor 200 is driven in a three-phase (U, V, W) driving system, for example, the rotation position of the rotor 130 may be sensed using a Hall sensor as a rotor position sensing element. To this end, a sensing magnet 172 rotating simultaneously with the rotor 130 is installed on the bottom of the wheel 110. When the rotor 130 is rotated, the rotation position of the rotor 130 may be sensed by a Hall sensor assembly 170 installed in the stator 140 facing the sensing magnet 172.

The rotor position sensing element for sensing the position signal of the rotor may use, for example, two or three Hall elements, in the three-phase driving system. The Hall sensor assembly 170 may have a structure in which three Hall sensors and peripheral circuit elements are mounted on a printed circuit board (PCB).

The hub-type electronic driving device 100 according to this invention includes the cable 180 having therein three wires for transmitting a driving signal for three-phase (U, V, W) driving, five wires for transmitting a rotor rotation position sense signal from the Hall sensor assembly 170 to a motor driving circuit (not illustrated), and two wires for temperature sensing.

In the BLDC motor 200, a three-phase (U, V, W) driving signal is applied from the motor driving circuit outside the housing to the stator inside the housing for three-phase (U, V, W) driving from the outside of the housing 110 into the housing, and the rotor rotation position sense signal and the internal temperature value of the motor are sensed from the Hall sensor assembly 170 installed inside the housing 110 and then transmitted to the motor driving circuit.

The hub-type electronic driving device 100 needs to maintain a sealing state when a cable containing a plurality of wires is introduced into or withdrawn from the housing, and the present invention completes a cable sealing structure using a cable guide assembly.

Hereinafter, the cable guide assembly according to the present invention will be described with reference to FIGS. 6A to 6D.

First, through-holes are formed in the center of the wheel 110 and the cover 112 forming the housing 110, respectively. First and second bearing housings 111*b* and 112*a* are formed on the outer circumferences of the through-holes, respectively. First and second bearings 161 and 162 are installed in the first and second bearing housings 111*b* and 112*a*, respectively. It is preferable that the first and second bearings 161 and 162 are formed of ball bearings.

In this case, the first bearing 161 has a larger diameter than the second bearing 162, and the cable guide assembly 190 is installed in the inner circumference of the first bearing 161. That is, the first bearing 161 is formed to have a diameter larger than that of the second bearing 162 so that the cable guide assembly 190 through which the cable 180 passes may be installed.

The cable guide assembly 190 includes a cable guide bracket 191, a silicon rubber ring 192, a cable bracket cover 198, and O-rings 195, 196, and 197.

The cable guide bracket 191 made of a metal material is coupled to an inner circumference of the first bearing 161, and the O-ring 196 is inserted into a groove provided on the outer circumference of the cable guide bracket 191. Thus, a sealing state is set between the first bearing 161 and the cable guide bracket 191. The cable guide bracket 191 may be made of, for example, an aluminum alloy, and may be molded by a die casting method.

The cable guide bracket 191 includes a shaft through-hole 193 through which the motor shaft 120 is penetrated and coupled, and a cable through-hole 194 through which the cable 180 passes by being biased to one side from the shaft through-hole 193. A cylindrical tube 191*b* extends from a body 191*a* to the outside of the wheel 110 so that the shaft through-hole 193 has a length longer than the cable through-hole 194, and a sealing stopper 199 is coupled to the motor shaft 120 at the front end of the cylindrical tube 191*b*, to limit the movement of the cable guide bracket 191 and supplement the sealing state.

A groove 191*c* is lengthily formed at an inlet of the cable through-hole 194 on the cylindrical tube 191*b* so that the cable 180 may be easily inserted into or withdrawn from the cable through-hole 194.

An annular flange 191*d* serving as a stopper protrudes from the inside of the wheel 110 of the cable guide bracket 191, and the flange 191*d* is caught by an inner circumference of the first bearing 161.

An annular groove is formed in the flange 191*d*, and an annular cable bracket cover 198 is coupled to the annular groove. The cable bracket cover 198 may be made of a synthetic resin, and has two through-holes corresponding to the shaft through-hole 193 and the cable through-hole 194 of the cable guide bracket 191. The rear end part of the cable bracket cover 198 is inserted into the annular groove 191*e* of the flange 191*d* and the front end part thereof is provided with a cylindrical extension part 198*a* extending into the cable through-hole 194.

The cable guide bracket 191 includes a stepped part 191*f* having an inner diameter larger than an inner diameter of the cable through-hole 194 by a predetermined length from the inlet of the cable through-hole 194 inside the housing to which the cable bracket cover 198 is coupled.

The O-ring 195 is inserted into a groove provided on the outer circumference of the motor shaft 120 passing through the shaft through-hole 193 of the cable guide bracket 191 to sealably couple between the shaft through-hole 193 and the motor shaft 120, and the silicon rubber ring 192 having elasticity and flexibility is inserted into the cable through-hole 194 to seal the cable through-hole 194. The silicon rubber ring 192 has a predetermined width, and a plurality of protrusions protruding from the inner side thereof are press-coupled to the outer circumference of the cable 180, thereby serving as a cable seal for setting the gap between the cable through-hole 194 and the cable 180 in a tight sealing state.

The silicon rubber ring 192 is compressed by the extension part 198*a* of the cable bracket cover 198 according to the assembly of the cable bracket cover 198, thereby limiting the installation position of the stepped portion 191*f*.

In the present invention, the silicon rubber ring 192 inserted into the cable through-hole 194 is compressed and coupled between the outer circumference of the cable 180 and the cable through-hole 194 to maintain the sealing state even if the cable 180 is moved.

In addition, the cable 180 has a predetermined diameter because a plurality of wires are contained therein. Therefore, the conventional method of passing through the hollow motor shaft has low assembly productivity and difficulty in forming a sealing structure, but according to the present invention, the cable guide bracket 191 having the shaft through-hole 193 and the cable through-hole 194 may be easily and precisely molded by a die casting method using an aluminum alloy, and using the same, the assembly productivity of the cable is high and the formation of the sealing structure is easy.

INDUSTRIAL APPLICABILITY

The present invention may applied to a hub-type driving motor in which a motor is contained in a wheel which also serves as a motor casing for driving an electric bicycle, an electric vehicle, an electric motorcycle, an electric scooter, an electric kickboard, and the like.

What is claimed is:

1. A hub-type electronic driving device comprising:
   a housing having a cup-shaped wheel and a cover having an outer circumferential portion which is coupled to an opening of the wheel;
   a motor shaft having both ends which are fixedly installed on a body outside the housing;
   first and second bearings installed in through-holes formed at the centers of the wheel and the cover, respectively, so as to rotatably support the housing around the motor shaft;
   a BLDC motor which is contained in the housing so as to rotate the housing around the motor shaft;
   a cable containing a plurality of wires for applying a motor driving signal to the BLDC motor from a motor driving circuit installed outside the housing; and
   a cable guide assembly installed between a first bearing supporting the wheel and the motor shaft to provide a shaft through-hole and a cable through-hole through which the motor shaft and a cable pass, respectively, and to maintain the sealing state of the shaft through-hole and the cable through-hole,
   wherein the BLDC motor comprises:
   a rotor in which a back yoke and a magnet are stacked on a cylindrical inner wall of the cup-shaped wheel; and a stator having an outer circumferential portion facing the magnet of the rotor with an air gap and having a central portion coupled to the outer circumference of the motor shaft to be fixed, and applying a rotating magnetic field to the rotor, further comprising:

an annular sensing magnet installed on the bottom of the cup-shaped wheel and configured to have a magnetic pole corresponding to the rotor magnet; and a Hall sensor assembly installed in the stator facing the sensing magnet to sense a rotation position of the rotor when the rotor is rotated.

2. The hub-type electronic driving device of claim 1, wherein the cable guide assembly comprises:

a cable guide bracket which is installed between the first bearing and the motor shaft, and has a shaft through-hole formed in the center thereof and through which the motor shaft is penetrated and coupled, and a cable through-hole deflected to one side from the shaft through-hole and through which the cable passes;

a silicon rubber ring inserted into the cable through-hole and fitted to the outer circumference of the cable; and a cable bracket cover fitted into the cable through-hole so that the front end portion thereof fixes the silicon rubber ring.

3. The hub-type electronic driving device of claim 2, wherein the cable guide bracket comprises:

a body in which the shaft through-hole and the cable through-hole are formed;

a cylindrical tube extending from the body to the outside of the wheel so that the shaft through-hole is longer than the cable through-hole; and an annular flange extending inside the wheel and serving as a stopper caught by the inner circumference of the first bearing, wherein the cable through-hole has a stepped portion that limits the position of the silicon rubber ring when the cable bracket cover is inserted into the cable through-hole.

4. The hub-type electronic driving device of claim 2, further comprising:

a first O-ring configured to seal between the first bearing and the cable guide bracket; and a second O-ring configured to seal state between the shaft through-hole of the cable guide bracket and the motor shaft.

5. The hub-type electronic driving device of claim 1, wherein the stator comprises:

an integrated stator core with a plurality of teeth extending radially from a ring-shaped yoke;

insulating bobbins formed by assembly or insert molding on the teeth;

coils wound on the bobbins;

a stator support surrounding the stator core with the bobbins integrally formed on the surface of the teeth; and a stator frame in which an outer ring is assembled by fitting coupling to the stator core and an inner ring is coupled to the motor shaft in a key coupling method using a key.

6. The hub-type electronic driving device of claim 5, wherein the stator is configured so that three wires carrying three-phase (U, V, W) drive signals required to drive the motor from the outside of the housing are incorporated into one cable and introduced into the housing, fixed to three busbars installed on the stator support of the stator, and then connected to three-phase (U, V, W) coils wound around a plurality of teeth, respectively.

7. The hub-type electronic driving device of claim 1, wherein the stator comprises:

an integrated core frame in which a plurality of teeth are radially extended on the outer circumference of an annular yoke, and an inner ring coupled to the motor shaft is connected to the inside of the annular yoke through a plurality of bridges;

an insulating film surrounding four side surfaces of the plurality of teeth except the outer circumferential surface facing the magnet of the rotor;

first and second insulators, each having an annular body and a plurality of extensions radially extending from the annular body to correspond to the plurality of teeth and the annular yoke, and assembled to one side and the other side of the integrated core frame; and coils wound around the teeth portion surrounded by the insulating film and the first and second insulators.

8. The hub-type electronic driving device of claim 7, wherein the first insulator further comprises:

an annular extension portion extending inward of the annular body, and the annular extension portion includes a Hall sensor fixing part for installing the Hall sensor assembly and a plurality of nuts embedded to fix bolts for busbars.

9. The hub-type electronic driving device of claim 8, further comprising:

a common terminal which is insert-molded into the annular body so that three common terminal ends protrude above the annular body, and forms a neutral point when the three-phase (U, V, W) coils are connected in a Y-wiring manner; and a plurality of winding guide protrusions integrally formed in the annular body and serving as a guide of the coils when the coils are wound on the plurality of teeth.

10. A hub-type electronic driving device comprising:

a housing having a cup-shaped wheel and a cover having an outer circumferential portion which is coupled to an opening of the wheel;

a motor shaft having both ends which are fixedly installed on a body outside the housing;

first and second bearings installed in through-holes formed at the centers of the wheel and the cover, respectively, to rotatably support the housing around the motor shaft;

a BLDC motor which is contained in the housing so as to rotate the housing around the motor shaft;

a rotor in which a back yoke and a magnet are stacked on a cylindrical inner wall of the cup-shaped wheel;

a stator having an outer circumferential portion facing the magnet of the rotor with an air gap and having a central portion coupled to the outer circumference of the motor shaft to be fixed, and applying a rotating magnetic field to the rotor;

a cable containing a plurality of wires for applying a motor driving signal to the BLDC motor from a motor driving circuit installed outside the housing; and a cable guide assembly installed between a first bearing supporting the wheel and the motor shaft to provide a shaft through-hole and a cable through-hole through which the motor shaft and a cable pass, respectively, and to maintain the sealing state of the shaft through-hole and the cable through-hole, wherein the motor shaft comprises:

first and second body coupling parts having threads formed at both ends thereof to be screw-coupled to the frame of the body;

a cable guide bracket coupling unit to which a cable guide bracket of the cable guide assembly is coupled;

a stator coupling unit coupled to an integrated core frame of the stator in an intermediate portion of the stator by a key coupling method; and a brake body coupling unit to which a brake body of the brake device is coupled, and wherein a plurality of stepped portions that increase or decrease in diameter are formed between the first body coupling part, the cable guide bracket coupling unit, the stator coupling unit, the brake body coupling unit, and the second body coupling part, and the stepped portions define an installation position of each portion.

11. The hub-type electronic driving device of claim 10, wherein the stator comprises:

an integrated core frame in which a plurality of teeth are radially extended on the outer circumference of the annular yoke, and an inner ring coupled to the motor shaft is connected to the inside of the annular yoke through a plurality of bridges.

12. The hub-type electronic driving device of claim 10, further comprising a brake device which is installed outside the cover and brakes the rotation of the housing, wherein the brake device comprises:

a brake ring installed in a groove of the cover;

a brake pad installed inside the brake ring and contracted and extended in accordance with the operation of a brake to compress the outer circumferential portion on the inner circumferential surface of the brake ring; and a brake body coupled to an inlet of the groove to block the inlet and having a central portion fixedly coupled to the motor shaft.

\* \* \* \* \*